Patented Sept. 16, 1952

2,610,923

UNITED STATES PATENT OFFICE 2,610,923

CAULKING COMPOSITION

Hugh Campbell Taylor, Flint, Mich.

No Drawing. Application April 26, 1949,
Serial No. 89,810

3 Claims. (Cl. 106—189)

This invention relates to a sealing composition, more particularly to a sealing composition useful in the caulking of boat hulls and having certain novel and useful characteristics hereinafter pointed out.

The sealing of boat hulls against leakage is an important and difficult problem. This is true, for example, in the case of wooden hulls wherein the planking is subject to swelling and shrinking during alternate periods of use in the water and storage ashore. Many types of sealing or caulking compositions have been used. These generally are in the form of a water insoluble putty-like composition containing drying oils and inert fillers which are packed into the seams between the planks and which subsequently dries and hardens somewhat to form a watertight joint. In the case of hulls having more than one layer of planking, a layer of the caulking composition is sometimes spread between the layers of planks.

A similar problem exists in the case of metal hulls as the sections thereof expand or contract with changes in temperature.

Such heretofore known compositions have invariably been characterized by their imperviousness to water and have depended for their effectiveness upon a continuous film or layer of the material being maintained across the seams and other openings through which it is desired to prevent the passage of water. The effectiveness of such materials decreases with age since most of them become harder and more inflexible as time goes on and thus no longer expand or contract to accommodate themselves to a change in size of an opening, such as may be occasioned by alternate swelling and shrinking of the planking or expansion and contraction of metal hull sections.

It is therefore an object of the present invention to provide a new and improved sealing composition.

An additional object is to provide an improved sealing composition particularly adapted to the sealing of boat hulls against leakage.

An additional object is to provide a sealing composition for boat hulls which swells upon contact with water and thus automatically prevents the passage of water through small openings in the hull.

An additional object is to provide a sealing composition comprising water-insoluble and water-soluble components useful in sealing small openings against the passage of water therethrough.

An additional object is to provide a method for making the new sealing composition hereinafter described.

These and related objects are accomplished readily and economically by mixing together certain water-soluble and certain water-insoluble substances, hereinafter more fully described to provide a stiff paste having a putty-like consistency which is characterized by the property of further stiffening on exposure to air to form a mass which is still plastic but is sufficiently stiff to withstand any ordinary pressure likely to be exerted against it, and which upon being recontacted with water again becomes soft and swells sufficiently to close small cracks and crevices which may appear therein or in adjacent planking and effectively prevent the passage of water therethrough.

The water-insoluble components of the composition include asbestos, coquina and bentonite. The water-soluble components of the composition include glycerine and hydroxyethyl cellulose.

The composition is prepared readily by mixing the several ingredients together in any suitable manner or in suitable proportions to form a stiff, putty-like paste mass which can be spread readily with a trowel or putty knife, but which is preferably sufficiently viscous to be substantially non-flowable except under slight pressure. A preferred mode of preparing the composition comprises first subdividing and mixing the asbestos, coquina and bentonite to form a substantially homogeneous dry powdered composition in which the coquina and bentonite are finely pulverized and the asbestos is in the form of short fibers preferably not more than a few millimeters in length. The glycerine and the aqueous hydroxyethyl cellulose are then mixed separately to form a substantially homogeneous, somewhat viscous, liquid and the powder and liquid are then mixed together. It is apparent that the water-insoluble substances can be ground separately or after mixing and that the powder mixture and liquid mixture can then be mixed in any convenient manner.

As mentioned previously, the asbestos is preferably used in the form of short fibers so that it is substantially evenly distributed through the mixture. Even though finely shredded, it still retains its fibrous characteristics to a degree sufficient to serve as a fibrous binder for the final composition particularly in the dry state. Any good grade of bentonite which swells readily upon contact with water can be used. It is preferable to use a bentonite, such as that generally referred to as Wyoming bentonite, which has as high a degree of swelling on contact with water as possible. The bentonite should be present in the final composition in finely divided form so that its swelling action is exerted immediately upon contact with water. The presence in the composition of lumps of bentonite which are penetrated only slowly by water is undesirable. The coquina referred to herein is a well-known mineral found in numerous places, particularly in Florida, and is generally found in the form of a porous mass of small shells cemented together. It is high in calcium carbonate content and pulverizes readily upon grinding. It is sometimes referred to as "coquina rock" or "coquina coral." For use in the composition of the present invention, the coquina is reduced to a fine powder in which form it still retains its highly porous nature. The function of the coquina in the composition is not entirely understood but it appears primarily to provide body to the composition and to effect a degree of hardening on exposure to air.

The hydroxyethyl cellulose is preferably used in the form of its water solution or dispersion. Such aqueous dispersions of hydroxyethyl cellulose are available commercially in a wide degree of viscosities and it has been found that an aqueous dispersion or solution having a viscosity of from about 70 to about 100 centipoises at 20° C. is preferable. A dispersion having this viscosity mixes readily with the other ingredients to give a final composition having desirable working properties and at the same time there is incorporated in the composition sufficient of the hydroxyethyl cellulose to give it desirable coherent properties in the dry state. The glycerine used can be of any suitable grade containing a high proportion of glycerine. In practice that often referred to as a "technical" or "commercial" grade is generally used because of its ready availability and low cost.

Although the several ingredients can be used over a wide range of proportions, satisfactory results have been obtained wherein the final composition contains (1) a mixture of solids comprising from about 42 to about 66 per cent by weight of finely shredded asbestos, from about 14 per cent to about 24 per cent by weight of pulverized coquina, from about 22 per cent to about 34 per cent by weight of finely pulverized bentonite, and (2) a mixture of liquids comprising from about 40 per cent to about 60 per cent by volume of glycerine and from about 40 to about 60 per cent by volume of aqueous hydroxyethyl cellulose having a viscosity of from about 70 to about 100 centipoises at 20° C. The solid materials and the liquid materials are mixed in proportions of about 10 pounds of solid materials to from about 9 pounds to about 10.5 pounds of liquid materials. A preferred composition comprises (1) a mixture of solids containing 54 per cent by weight of asbestos, 27 per cent of Wyoming bentonite and 19 per cent of coquina; and (2) a mixture of liquids containing 50 per cent by volume of commercial glycerine and 50 per cent by volume of aqueous hydroxyethyl cellulose (about 55.2 per cent of glycerine and about 44.8 per cent of aqueous hydroxyethyl cellulose on a weight basis). The solid materials mixed as aforesaid are mixed with the liquid materials in the proportion of 10 pounds of solid material to 9.86 pounds of liquid material, the final mixture thus containing, on a weight basis about 27.2 per cent asbestos, 13.6 per cent bentonite, 9.6 per cent coquina, 27.4 per cent glycerine and 22.2 per cent aqueous hydroxyethyl cellulose.

The sealing composition of the invention can be used in a number of ways and for a number of purposes. It is particularly well adapted for use in sealing the hulls of boats having either multiple layers of planking or sheathing or conjoined metal panels. When used for this purpose with planking a thin layer of the paste composition is generally spread on the layer of planking which is to receive the outside sheathing and the latter then secured in place with screws or in other conventional manner. When applied in this way, the composition is forced into all of the cracks and crevices in and between the planking and frequently exudes through the seams between the planking and sheathing when the latter are drawn together. Such exuded material can be scraped off and re-used or discarded leaving the cracks full of the plastic composition. Even after standing for several hours or days under adverse temperature and humidity conditions, the composition dries only to a plastic condition having both considerable structural strength and flexibility. In this state, it easily absorbs water causing the bentonite to swell and this in turn compresses adjacent layers of the composition to such an extent that further passage of water through the compressed layers is prevented thereby effectively sealing the opening. The wide range of expansion and contraction available to this composition gives it a wide range of uses, a high degree of versatility and a high degree of reliability under varying conditions.

The composition can also be used as a caulking material for seams which have opened up in a hull provided it is subsequently covered by a good grade of varnish, lacquer or paint. It is not recommended that the composition be used where relatively large surfaces of it are exposed to water, particularly if at the same time it is exposed to abrasion such as might be caused by a stream of water moving rapidly past it. Under such circumstances the composition gradually softens and the softened layer becomes abraded away and the entire mass of composition gradually disappears. It will, however, since it is also substantially non abrasive, function in a highly satisfactory manner as a packing material for a stuffing box exposed to water as on the propeller shaft of power driven boats and vessels, since it effects a high degree of sealing and a minimum of shaft abrasion. The composition is also useful in other types of construction work where putty is ordinarily employed. It can be used as a glazing compound for glazing windows, for filling cracks prior to painting, and the like. It is particularly well adapted, however, for use where a sealing action against the passage of water is desirable. It should also be mentioned that other components can be included in the composition, such as colored mineral or organic pigments, flexibilizing and the like. In some instances emulsified asphalt can replace the hydroxyethyl cellulose in the composition to advantage to decrease substantially the rate of penetration of water into the composition and also to render it somewhat more flexible and/or adhesive.

Example 1

A finely powdered mixture was prepared consisting of 54 per cent by weight of finely shredded asbestos, 27 per cent by weight of pulverized Wyoming bentonite having a high degree of swelling upon contact with water and 19 per cent by weight of finely ground coquina. A separate liquid mixture was prepared consisting of 50 per cent by volume of aqueous hydroxyethyl cellulose having a specific gravity of about 1.02 and a viscosity of about 70–100 centipoises at 20° C. and 50 per cent by volume of technical glycerine having a specific gravity of about 1.26.

The liquid mixture and the powdered mixture were then stirred thoroughly together in a proportion consisting of 10 parts by weight of said solid material and 9.86 parts by weight of liquid material, and the final composition kneaded into a stiff, putty-like plastic mass.

Example 2

A finely powdered mixture was prepared consisting of 54 per cent by weight of finely shredded asbestos, 27 per cent by weight of pulverized Wyoming bentonite having a high degree of swelling upon contact with water and 19 per cent by weight of finely ground coquina. A separate liquid mixture was prepared consisting of 60 per cent by volume of emulsified asphalt and 40 per cent by volume of technical glycerine.

The liquid mixture and the powdered mixture were then stirred thoroughly together in approximately equal proportions by weight and the final composition kneaded into a stiff, putty-like plastic mass.

A layer of the stiff paste from about $\frac{1}{32}$ to about $\frac{1}{16}$ inch thick was then spread evenly over the outside surface of the inner planking of a boat hull under construction. The sheathing was then secured in place on the planking with screws in conventional fashion thus compressing the paste composition between the layer of planking and the layer of sheathing. Sealing composition which had exuded through the seams in the planking and in the sheathing was scraped off and the hull allowed to dry for several days. It was then sanded and varnished in conventional manner and was found to be exceptionally water-tight. The hull, after storage ashore exposed to the weather for several weeks, was again placed in the water and found to be free of all leaks or seepage.

I claim:

1. A caulking composition comprising: a liquid part comprising from about 40 to about 60 parts by volume of aqueous hydroxyethyl cellulose having a viscosity of from about 70 to about 100 centipoises at about 20° centigrade and from about 40 to about 60 parts of glycerine; and a solid part comprising from about 42 to about 66 parts by weight of finely shredded asbestos, from about 22 to about 34 parts of finely divided bentonite and from about 14 to about 24 parts of finely divided coquina, said liquid and solid portions being intimately mixed in proportions to form a stiff paste.

2. A caulking composition comprising: a liquid phase comprising from about 40 to about 60 parts by volume of aqueous hydroxyethyl cellulose having a viscosity of from about 70 to about 100 centipoises at about 20° centigrade and from about 40 to about 60 parts of glycerine; and a solid phase comprising from about 42 to about 66 parts by weight of finely shredded asbestos, from about 22 to about 34 parts of finely divided bentonite and from about 14 to about 24 parts of finely divided coquina, said liquid and solid phases being intimately mixed in approximately equal parts by weight.

3. A stiff substantially uniform paste composition comprising on a weight basis about 27 per cent of finely shredded asbestos, about 14 per cent of powdered bentonite, about 10 per cent of finely powdered coquina, about 27 per cent of glycerine, and about 22 per cent of aqueous hydroxyethyl cellulose having a viscosity of from about 70 to about 100 centipoises at about 20° centigrade.

H. CAMPBELL TAYLOR.

REFERENCES CITED

The following references are of record in the file of this patent:

UNITED STATES PATENTS

| Number | Name | Date |
|---|---|---|
| 1,974,745 | Klinkenstein | Sept. 25, 1934 |
| 2,236,718 | Poschel | Apr. 1, 1941 |
| 2,332,696 | Champion | Oct. 26, 1943 |
| 2,389,761 | Burgeni | Nov. 27, 1945 |

FOREIGN PATENTS

| Number | Country | Date |
|---|---|---|
| 24,549 | Great Britain | of 1906 |